UNITED STATES PATENT OFFICE.

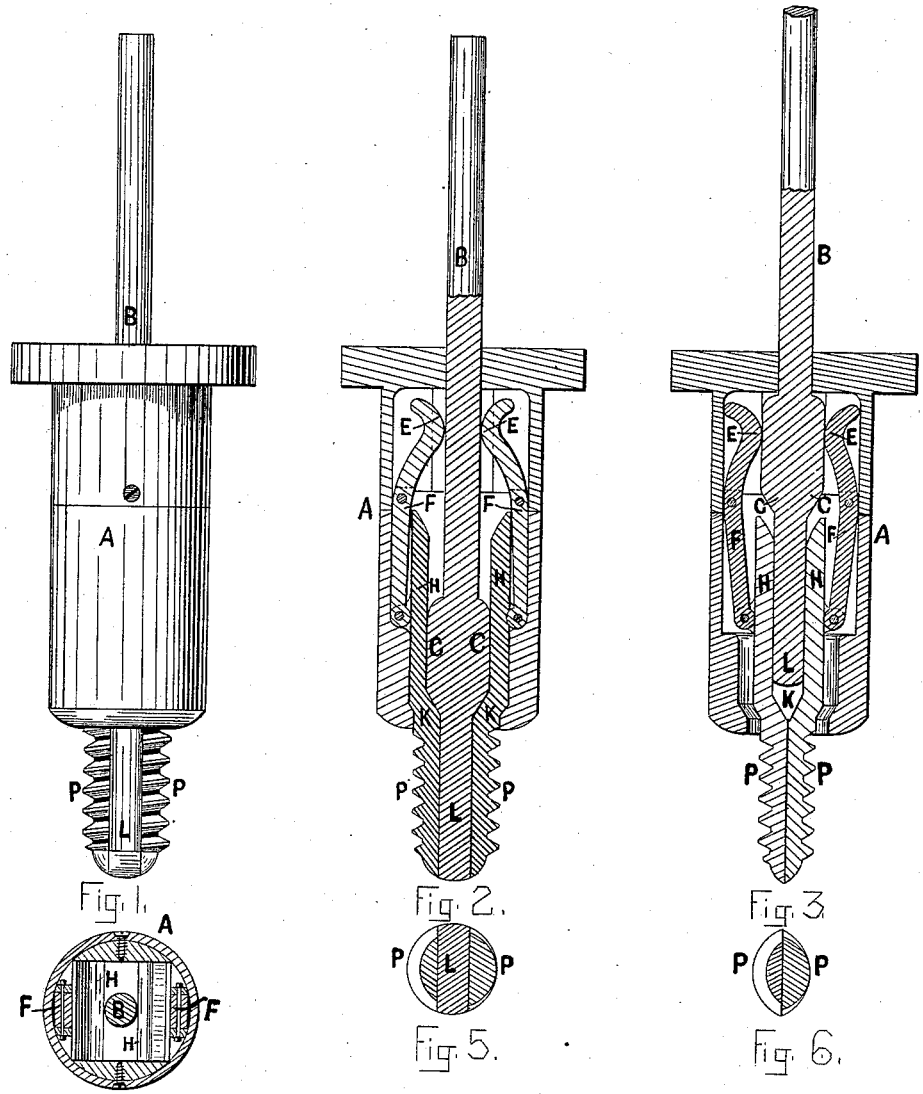

LAWRENCE B. GRAY, OF BOSTON, MASSACHUSETTS.

PRESS FOR MOLDING GLASS INSULATORS.

SPECIFICATION forming part of Letters Patent No. 306,146, dated October 7, 1884.

Application filed March 13, 1884. (No model.)

*To all whom it may concern:*

Be it known that I, LAWRENCE B. GRAY, of Boston, in the county of Suffolk and State of Massachusetts, have invented certain new and useful Improvements in Presses for Molding Glass Insulators, of which the following is a specification.

The objects of my invention are to provide a contractible screw-threaded plunger for molding glass or porcelain insulators having an internal screw-thread formed therein upon the opposite sides of the interior hole or opening, whereby the plunger may be pressed into the insulator, so as to form a female screw-thread therein, and permit the plunger to be contracted in its diameter and withdrawn therefrom at a single vertical movement without the necessity of rotating the same to withdraw it from the screw-thread thus formed within the insulator which extends around upon opposite sides of the hole or opening about two-thirds of the circumference, or about one-third the circumference at each section, or upon sides thereof; and it consists in the construction, combination, and arrangement of the several parts of the plunger, as hereinafter more fully described, and set forth in the annexed claim.

Figure 1 represents a side elevation of a plunger constructed according to my invention, showing the same in an expanded position. Fig. 2 represents a vertical central section. Fig. 3 represents a similar view of the same shown in a contracted position. Fig. 4 represents a horizontal cross-section taken through the shell or case. Fig. 5 represents a cross-section through the screw-thread portion. Fig. 6 represents a cross-section through the same when contracted.

A represents the outer shell or case, formed in any suitable manner and of any shape or size desired, and provided with a hole or opening in the upper end, through which is fitted to slide the plunger-stem B, provided toward the lower portion thereof, within the said shell or case A, with projecting portions C upon opposite sides thereof, having incline or rounded shoulders at top and bottom of said projections C, which contact with the inclines or curved portions E upon the inward surfaces of the pivoted actuating levers or bars F, which are pivoted to the said shell or case A at about their mid-length, and at their lower opposite ends to the outward faces of the actuating-bars H, which are provided upon their inward faces with curved or incline portions K, against which the lower end portion, L, of the said plunger-stem strikes when forced downward, and opens, expands, or forces outward each of the screw-threaded portions P of the said actuating-bars H, as shown in Figs. 1 and 2. It will be seen and understood that when the plunger thus formed has been forced downward into the glass or porcelain placed within a suitable mold a hole or opening will be formed thereby, corresponding internally upon its faces vertically and circumferentially to the external surface of the screw-threaded portions P, and the plain surfaces of the opposite edges or sides of the portion L, which, being withdrawn vertically by means of its stem B, forces inwardly or toward each other the two screw-threaded portions P by the reverse action and movement of the several parts described, so as to permit the screw-threaded portions P to be released and moved inwardly from the screw-thread thus formed in the insulator, so as to permit the same to be withdrawn vertically therefrom at a single upward movement without disturbing the screw-thread formed.

It will be seen and understood that by a duplication of the operative or actuating parts arranged upon the opposite sides, so as to be actuated in succession and upon four sides, a continuous screw-thread may be thus formed within the insulator, extending circumferentially throughout the interior surface of the hole or opening uniformly upon all sides, the sliding plunger-stem portion actuating within the screw-threaded portion centrally, or only in the center thereof, allowing each of four sides to be drawn together inwardly, the two opposite sides simultaneously, and then the two other side portions in like manner; or, if desired, a three-side mechanism or triplicate devices may be arranged to act simultaneously in like manner to the duplicate mechanism first above described, and shown in the drawings.

Having thus described my invention, what I claim is—

The combination, with the shell or case A, of the plunger B, provided with the projections C, having parallel faces, pivoted actuating-levers F, and actuating-bars H, provided with a screw-thread, P, substantially as described.

LAWRENCE B. GRAY.

Witnesses:
SYLVENUS WALKER,
CHAS. S. GOODING.